UNITED STATES PATENT OFFICE.

A. J. FERGUSON, OF SHARON, PENNSYLVANIA.

IMPROVED COMPOSITION FOR CURING CORNS, BUNIONS, &c.

Specification forming part of Letters Patent No. 81,486, dated August 25, 1868.

*To all whom it may concern:*

Be it known that I, A. J. FERGUSON, of Sharon, in the county of Mercer and State of Pennsylvania, have invented a certain new and useful Compound for Curing Corns and Bunions; and I do hereby declare that the following is a full, clear, and exact description thereof.

I take one dram of the spirits of turpentine, one dram of the spirits of camphor, two (2) drams of hartshorn or ammonia, and three (3) of olive-oil, and mix them well together.

The manner in which I now treat the corn or bunion is as follows: Pare it until it becomes tender; then bathe or wash it with the essence of salt, or muriatic acid, which will allay the pain, if there be any. I now apply the compound above described, and in a short time the corn or bunion will be entirely cured.

What I claim as new, and desire to secure by Letters Patent, is—

The within-described process of treating corns and bunions, consisting, first, in bathing the corn or bunion with muriatic acid, and then applying the compound, prepared as herein specified.

In testimony that I claim the foregoing as my own I affix my signature in presence of two witnesses.

A. J. FERGUSON.

Witnesses:
ABNER APPLEGATE,
J. P. CLARK.